(12) United States Patent
Zhang et al.

(10) Patent No.: US 11,320,407 B2
(45) Date of Patent: May 3, 2022

(54) GAS CHROMATOGRAPH-ION MOBILITY SPECTROMETRY COMBINED EQUIPMENT

(71) Applicants: NUCTECH COMPANY LIMITED, Beijing (CN); TSINGHUA UNIVERSITY, Beijing (CN)

(72) Inventors: Qingjun Zhang, Beijing (CN); Yuanjing Li, Beijing (CN); Zhiqiang Chen, Beijing (CN); Weiping Zhu, Beijing (CN); Yaohong Liu, Beijing (CN); Qiufeng Ma, Beijing (CN); Ge Li, Beijing (CN); Biao Cao, Beijing (CN); Lili Yan, Beijing (CN)

( * ) Notice: Subject to any disclaimer, the term of this patent is extended or adjusted under 35 U.S.C. 154(b) by 300 days.

(21) Appl. No.: 16/714,799

(22) Filed: Dec. 16, 2019

(65) Prior Publication Data

US 2020/0240961 A1     Jul. 30, 2020

(30) Foreign Application Priority Data

Dec. 18, 2018  (CN) .......................... 201811547282.1

(51) Int. Cl.
*G01N 30/44*     (2006.01)
*G01N 30/72*     (2006.01)

(52) U.S. Cl.
CPC ......... *G01N 30/44* (2013.01); *G01N 30/7206* (2013.01)

(58) Field of Classification Search
CPC .... G01N 30/44; G01N 30/7206; G01N 30/02; G01N 30/34; G01N 30/72
See application file for complete search history.

(56) References Cited

U.S. PATENT DOCUMENTS

| 3,672,207 A | * | 6/1972 | Cramp | .................. | G01M 3/229 |
| | | | | | 73/40.7 |
| 5,736,739 A | | 4/1998 | Uber et al. | | |
| 2016/0069611 A1 | * | 3/2016 | Lochner | ................. | F25J 3/0409 |
| | | | | | 62/654 |

FOREIGN PATENT DOCUMENTS

| CN | 107907622 A | 4/2018 |
| CN | 108845054 A | 11/2018 |
| CN | 109307724 A | 2/2019 |
| CN | 209542533 U | 10/2019 |
| GB | 2391700 A | 2/2004 |

* cited by examiner

*Primary Examiner* — Peter J Macchiarolo
*Assistant Examiner* — John M Royston
(74) *Attorney, Agent, or Firm* — Kilpatrick Townsend & Stockton, LLP (57) ABSTRACT

The present disclosure discloses a gas chromatograph-ion mobility spectrometry combined equipment, including: a gas chromatograph device for pre-separating a to-be-detected sample to form a pre-separated sample; an ion mobility spectrometry device in fluid communication with an outlet of the gas chromatograph device for detecting the pre-separated sample; and a gas circulating device in fluid communication with a discharged gas interface of the ion mobility spectrometry device for processing a discharged gas from the ion mobility spectrometry device, wherein the gas circulating device is further in gas communication with the gas chromatograph device for conveying a part of the discharged gas to the gas chromatograph device to serve as a carrier gas, which drives the to-be-detected sample to enter the gas chromatograph device. The miniaturization and the portability of the gas chromatograph-ion mobility spectrometry combined equipment are improved.

14 Claims, 3 Drawing Sheets

GAS CHROMATOGRAPH-ION MOBILITY SPECTROMETRY COMBINED EQUIPMENT

CROSS-REFERENCES TO RELATED APPLICATIONS

The present application claims the priority of Chinese Application No. 201811547282.1, filed in the Chinese Patent Office on Dec. 18, 2018, whose entire contents are herein incorporated by reference.

TECHNICAL FIELD

The present disclosure relates to the technology field of analysis and detection, in particular to a gas chromatograph-ion mobility spectrometry combined equipment.

BACKGROUND

With the advantages of being portable, fast, sensitive and productive, an ion mobility spectrometry (IMS) is widely used in military, national defense, industry, environment, clinical diagnosis and other fields. However, due to the interference of other complex matrices such as water vapor or the like in the detection environment, the identification qualitative ability and quantitative ability of the ion mobility spectrometry are greatly limited. A gas chromatograph (GC), being a generally recognized separation tool of high efficiency and high stability, is widely used in the separation and analysis of gas phase substances. Among techniques known to inventors, gas chromatograph-ion mobility spectrometry combined equipment has existed. The gas chromatograph-ion mobility spectrometry combined equipment is for separating and detecting complex substances, and the gas chromatograph-ion mobility spectrometry combined equipment have advantages of the high separation ability of the gas chromatograph and the high sensitivity, good resolution and fast response of the ion mobility spectrometry.

The gas chromatograph-ion mobility spectrometry combined equipment known to the inventors is generally large in volume and heavy in weight, and needs to be provided with a gas source to supply a clean sample injection carrier gas for the gas chromatograph portion, furthermore, the sampling and sample injection are complex, and the analysis time is long, to limit the application range of the gas chromatograph-ion mobility spectrometry combined equipment.

SUMMARY

The present disclosure provides a kind of gas chromatograph-ion mobility spectrometry combined equipment, including:

a gas chromatograph device, configured to pre-separating a to-be-detected sample to form a pre-separated sample;

an ion mobility spectrometry device, in fluid communication with an outlet of the gas chromatograph device for detecting the pre-separated sample; and a gas circulating device in fluid communication with a discharged gas interface of the ion mobility spectrometry device for processing a discharged gas from the ion mobility spectrometry device, wherein the gas circulating device is in gas communication with the gas chromatograph device for conveying a part of the discharged gas to the gas chromatograph device to serve as a carrier gas, which drives the to-be-detected sample to enter the gas chromatograph device.

In some embodiments, the gas circulating device comprises a discharged gas purification device for purifying the discharged gas, and the part of the discharged gas is the purified discharged gas from the discharged gas purification device.

In some embodiments, wherein the gas circulating device further comprises at least one of the following:

a first discharged gas driving device, communicating the discharged gas interface and an inlet of the discharged gas purification device for driving the discharged gas from the ion mobility spectrometry device to enter the discharged gas purification device;

a second discharged gas driving device, being arranged between an outlet of the discharged gas purification device and an inlet of the gas chromatograph device for driving the part of the discharged gas to enter the gas chromatograph device.

In some embodiments, the first discharged gas driving device comprises a diaphragm pump; and/or, the second discharged gas driving device comprises a booster pump.

In some embodiments, the gas circulating device further comprises at least one of the following:

a first buffer device, communicating the discharged gas interface and an inlet of the discharged gas purification device;

a second buffer device, communicating an outlet of the discharged gas purification device and an inlet of the gas chromatograph device.

In some embodiments, the first buffer device comprises a first buffer film and a first buffer chamber structure with a first opening, and the first buffer film is disposed at the first opening to seal the first opening; and/or, the second buffer device comprises a second buffer film and a second buffer chamber structure with a second opening, and the second buffer film is disposed at the second opening to seal the second opening.

In some embodiments, the second buffer device communicates the outlet of the discharged gas purification device and a migration gas inlet of the ion mobility spectrometry device, so that a part of the discharged migration gas purified by the discharged gas purification device enters the ion mobility spectrometry device to serve as a migration gas.

In some embodiments, the gas circulating device further comprises at least one of the following:

a discharged gas flow rate adjusting component, being arranged between an inlet of the discharged gas purification device and a discharged gas interface of the ion mobility spectrometry device for adjusting the discharge gas flow rate of the discharged gas that flows from the ion mobility spectrometry device to the discharged gas purification device;

a carrier gas flow rate adjusting component, being arranged between an outlet of the discharged gas purification device and an inlet of the gas chromatograph device for adjusting the carrier gas flow rate of the discharged gas that flows from the discharged gas purification device to the gas chromatograph device.

In some embodiments, the gas chromatograph-ion mobility spectrometry combined equipment further comprises a sample exchange device, and the sample exchange device comprises a supporting structure and a semipermeable membrane, wherein the supporting structure has a hollow chamber, the semipermeable membrane is arranged in the hollow chamber to divide the hollow chamber into a collected sample chamber and a chromatographic sample chamber, a sample flows from the collected sample chamber to the chromatographic sample chamber through the semipermeable membrane to form the to-be-detected sample, and the gas circulating device is communicated with the inlet of the gas chromatograph device by the chromatographic sample chamber.

In some embodiments, the gas chromatograph-ion mobility spectrometry combined equipment comprises a sampling device, and the sampling device comprises a sampling driving device and a sampling head, wherein the sampling driving device and the sampling head are communicated with the sample chamber, and the sampling driving device drives the sample collected by the sampling head to enter the collected sample chamber by applying an attraction force to the sample.

In some embodiments, the hollow chamber is a fusiform chamber having small cross-sectional areas at both ends and a large cross-sectional area at the middle, the collected sample chamber is provided with a sample inlet for receiving the sample and a sample exhaust gas outlet for discharging a sample exhaust gas, the sample inlet and the sample exhaust gas outlet being respectively arranged at two ends of the fusiform chamber, and the chromatographic sample chamber is provided with a carrier gas inlet for receiving the part of the discharged gas and a sample output port for outputting a mixture of the to-be-detected sample and the carrier gas to the gas chromatograph device, and the carrier gas inlet and the sample output port being respectively arranged at two ends of the fusiform chamber.

In some embodiments, a guide groove is formed on an inner wall of the hollow chamber, and the guide groove is configured to guide the gas in at least one of the collected sample chamber or the chromatographic sample chamber to flow.

In some embodiments, the sample exchange device further comprises at least one of the following:

a semipermeable membrane heating device, configured to heat the semipermeable membrane;

a semipermeable membrane cooling device, configured to cool the semipermeable membrane to achieve sample enrichment.

In some embodiments, the semipermeable membrane heating device is configured to perform pulse heating on the semipermeable membrane.

In some embodiments, the gas circulating device comprises a communication port in communication with the atmosphere and a communication gas purification device for purifying the gas flowing through the communication port.

Based on the gas chromatograph-ion mobility spectrometry combined equipment in the present disclosure, the to-be-detected sample enters the gas chromatograph device under the driving of a part of the discharged gas, that is, the chromatographic sample injection carrier gas adopts clean circulating air, therefore the gas chromatograph-ion mobility spectrometry combined equipment needn't an external or built-in gas tank, to improve the miniaturization and the portability of the gas chromatograph-ion mobility spectrometry combined equipment, and expanding the application range of the gas chromatograph-ion mobility spectrometry combined equipment.

Other features and advantages of the present disclosure thereof will become apparent from the following detailed description of exemplary embodiments of the present disclosure with reference to the drawings.

BRIEF DESCRIPTION OF THE DRAWINGS

To illustrate the embodiments of the present disclosure or technical solutions in the prior art more clearly, a brief introduction on the drawings which are needed in the description of the embodiments or the prior art is given below. Apparently, the drawings in the description below are merely some of the embodiments of the present disclosure, based on which other drawings can be obtained by those of ordinary skill in the art without any creative effort.

DETAILED DESCRIPTION OF THE INVENTION

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. The following description of at least one exemplary embodiment is merely illustrative and is in no way used as any limitation to the present disclosure and its application or usage. All of other embodiments, obtained by those of ordinary skill in the art based on the embodiments of the present disclosure without any creative effort, fall into the protection scope of the present disclosure.

Techniques, methods and devices known to those of ordinary skill in related fields may not be discussed in detail, but where appropriate, the techniques, methods and devices should be considered as a part of the authorized specification.

In the description of the present disclosure, it should be understood that orientation or position relationships indicated by orientation words such as "front, back, upper, lower, left, right", "transverse, longitudinal, vertical, horizontal" and "top, bottom" and the like generally are orientation or position relationships shown on the basis of the drawings, and are merely for the convenience of describing the present disclosure and simplifying the description. In the absence of opposite statement, these orientation words do not indicate or imply that the referred devices or elements must have specific orientations or must be constructed and operated in specific orientations, and thus cannot be understood as limitation of the protection scope of the present disclosure; the orientation words "inside" and "outside" refer to the inside and outside of the contours of the components themselves.

In the description of the present disclosure, it should be understood that the terms "first", "second" and the like are used for defining components and parts, and are merely for the convenience of distinguishing the corresponding components and parts. Unless otherwise stated, the above words have no special meaning, and thus cannot be understood as limitation of the protection scope of the present disclosure.

Figure 1:
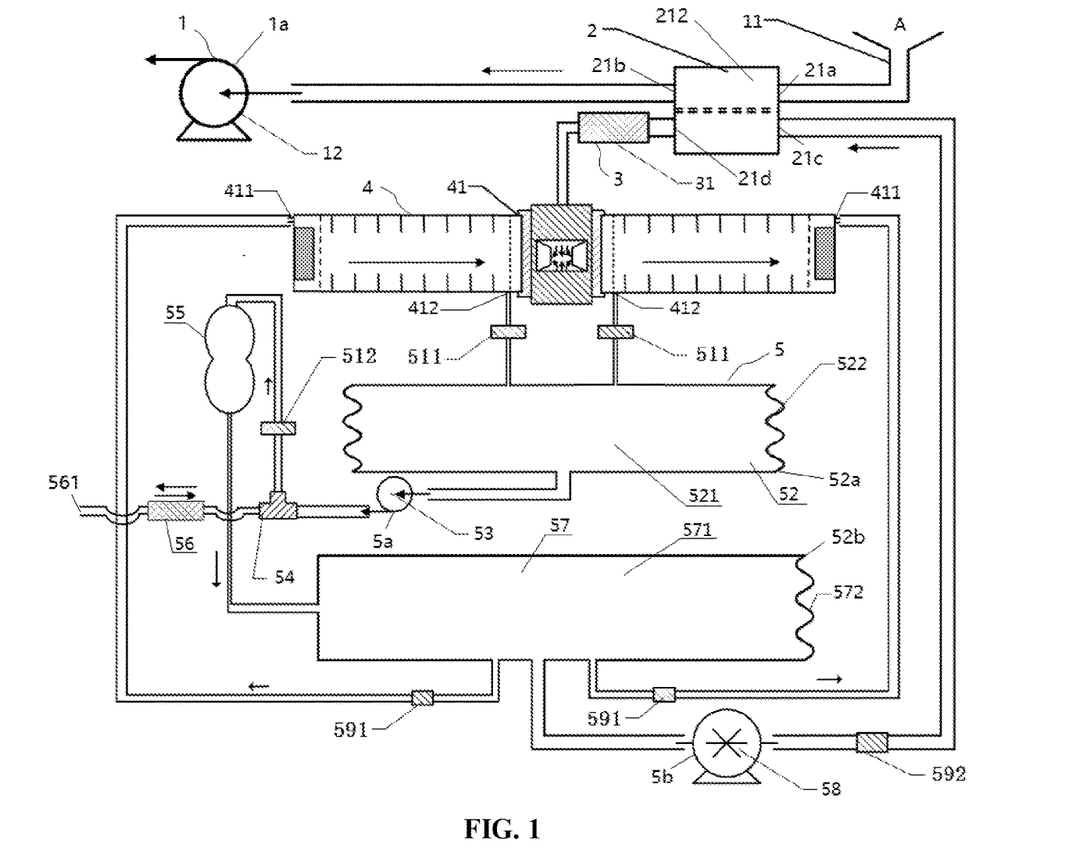
FIG. 1 shows a schematic diagram of the structure and gas path principle of gas chromatograph-ion mobility spectrometry combined equipment in one embodiment of the present disclosure.
Figure 2:
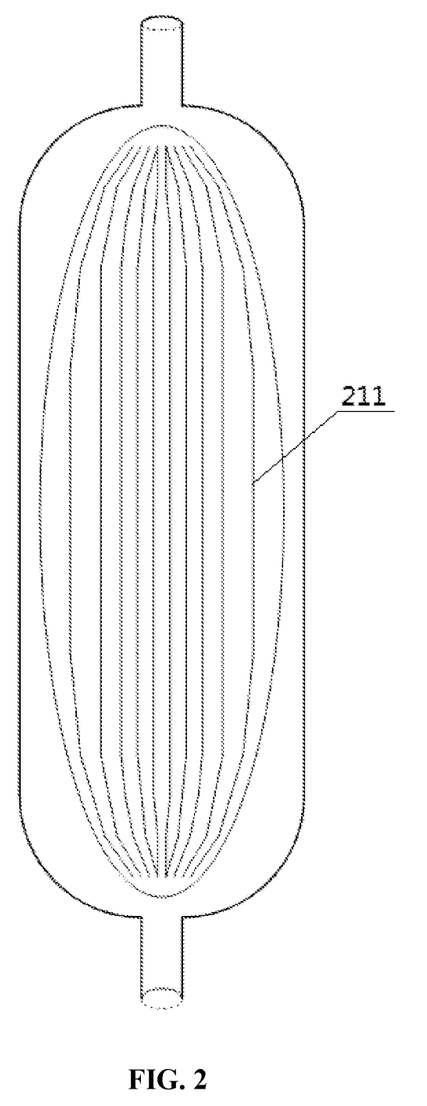
FIG. 2 shows a schematic diagram of the structure principle of a sample exchange device as shown in FIG. 1.
Figure 3:
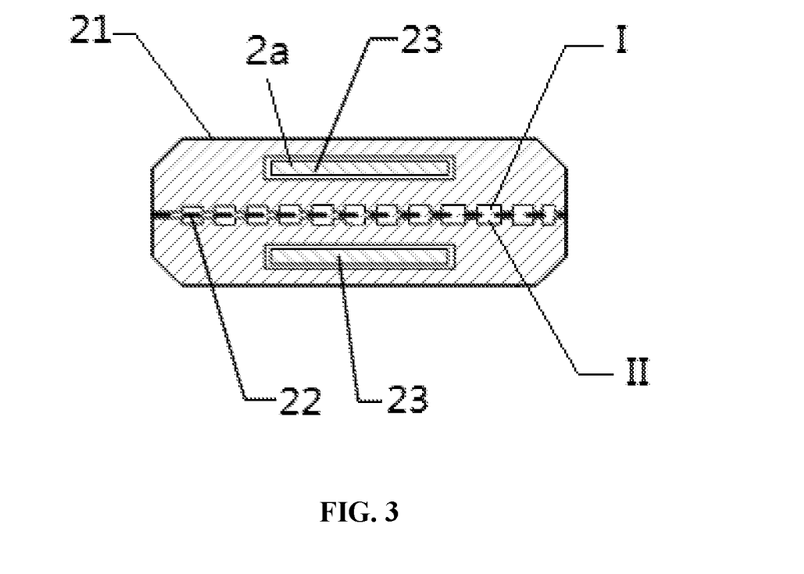
FIG. 3 shows a schematic diagram of a cross section structure of the sample exchange device as shown in FIG. 1.

As shown in FIG. 1 to FIG. 3, a gas chromatograph-ion mobility spectrometry combined equipment provided by embodiments of the present disclosure mainly includes a gas chromatograph device 3, an ion mobility spectrometry device 4 and a gas circulating device 5. The gas chromatograph device 3 is configured to pre-separate a to-be-detected sample to form a pre-separated sample. The ion mobility spectrometry device 4 is in fluid communication with an outlet of the gas chromatograph device 3 for detecting the pre-separated sample. The gas circulating device 5 in fluid communication with a discharged gas interface 412 of the ion mobility spectrometry device 4 for processing a discharged gas from the ion mobility spectrometry device 4. The discharged gas is a mixed gas including a carrier gas and a migration gas. The gas circulating device 5 performs, for example, buffering, purifying and/or recycling on the discharged gas. The gas circulating device 5 is further in gas communication with the gas chromatograph device 3 for conveying a part of the discharged gas to the gas chromatograph device 3 to serve as the carrier gas, which drives the to-be-detected sample to enter the gas chromatograph device 3.

In the gas chromatograph-ion mobility spectrometry combined equipment, the to-be-detected sample enters the gas chromatograph device 3 under the driving of a part of the discharged gas, that is, the chromatographic sample injection carrier gas adopts clean circulating air, therefore no external or built-in gas tank is needed, to improve the miniaturization and the portability of the gas chromatograph-ion mobility spectrometry combined equipment, and expanding the application environment of the gas chromatograph-ion mobility spectrometry combined equipment.

In some embodiments, the gas chromatograph device 3 includes a chromatographic column 31 and a chromatography column heating jacket sleeved at the outside of the chromatographic column 31. The chromatographic column 31 is implemented as, for example, a Multi-Capillary Column (MCC), which is of high column efficiency and high separation ability.

In some embodiments, the ion mobility spectrometry device 4 is, a migration tube 41 with both positive and negative modes, such as an integrated ceramic dual-mode migration tube. In other embodiments, the ion mobility spectrometry device 4 is a positive or negative single-mode migration tube.

As shown in FIG. 1, in some embodiments, the gas circulating device 5 includes a discharged gas purification device 55. The discharged gas purification device 55 is configured to purify the discharged gas. In this case, the foregoing part of the discharged gas serving as the carrier gas is a purified discharged gas from the discharged gas purification device 55. The discharged gas purification device 55 is, for example, a molecular sieve.

As shown in FIG. 1, in some embodiments, the gas circulating device 5 includes a first discharged gas driving device 5a, and the first discharged gas driving device 5a communicates the discharged gas interface 412 of the ion mobility spectrometry device 4 and an inlet of the discharged gas purification device 55 for driving the discharged gas from the ion mobility spectrometry device 4 to enter the discharged gas purification device 55, to provide a driving force for the gas circulation. The first discharged gas driving device 5a includes, for example, a diaphragm pump 53.

As shown in FIG. 1, in some embodiments, the gas circulating device 5 includes a second discharged gas driving device 5b, and the second discharged gas driving device 5b is arranged between an outlet of the discharged gas purification device 55 and an inlet of the gas chromatograph device 3. Since the gas resistance of the gas chromatograph device 3 is relatively large, the second discharged gas driving device 5b can provide an additional driving force.

In some embodiments, the second discharged gas driving device 5b is a booster pump 58. In other embodiments, the second discharged gas driving device 5b is a diaphragm pump.

Compared with the diaphragm pump, the booster pump 58 can provide a higher and more stable pre-column pressure for the chromatographic column 31, so the multicapillary column or a capillary chromatographic column with higher separation ability are more suitable to be used, which is conducive to improving the detection accuracy of complex samples.

As shown in FIG. 1, in some embodiments, the gas circulating device 5 includes a first buffer device 52. The first buffer device 52 communicates the discharged gas interface 412 of the ion mobility spectrometry device 4 and the inlet of the discharged gas purification device 55, in this case, the first buffer device 52 can reduce the disturbance of the air suction pulse airflow of the diaphragm pump to the internal airflow of the ion mobility spectrometry device 4, to improve the stability of the signal of the ion mobility spectrometry. The first buffer device 52 includes, for example, a first buffer film 522 and a first buffer chamber structure 521 having a first opening 52a, and the first buffer film 522 is arranged at the first opening 52a of the first buffer chamber structure 521 to seal the first opening 52a.

In some embodiments, the gas circulating device 5 further includes a second buffer device 57. A first end of the second buffer device 57 communicates with an outlet of the discharged gas purification device 55, a second end of the second buffer device 57 communicates (may indirectly communicate via other components) with the inlet of the gas chromatograph device 3, and a third end of the second buffer device 57 (the number of the third end is not limited to one or two) communicates with a migration gas inlet 411 of the ion mobility spectrometry device 4, so that the disturbance of the air injection pulse airflow of the diaphragm pump to the internal airflow of the ion mobility spectrometry device 4 can be reduced, which improves the stability of the signal of the ion mobility spectrometry. The second buffer device 57 includes, for example, a second buffer film 572 and a second buffer chamber structure 571 having a second opening 52b, and the second buffer film 572 is arranged at the second opening 52b of the second buffer chamber structure 571 to seal the second opening 52b.

In the present embodiment, the buffer devices are arranged at both of the upstream and downstream of the diaphragm pump 53, and the buffer films are arranged at the openings of the rigid buffer chamber structures for sealing, so that the influence of the pulse airflow of the diaphragm pump 53 and the booster pump 58 on the airflow and the pressure in the ion mobility spectrometry device 4 can be reduced. The first buffer film 522 and the second buffer film 572 are, for example, latex buffer films having excellent stretch ability.

As shown in FIG. 1, the second buffer device 57 also communicates the outlet of the discharged gas purification device 55 and the migration gas inlet 411 of the ion mobility spectrometry device 4, so that a part of the discharged gas purified by the discharged gas purification device 55 enters the ion mobility spectrometry device 4 to serve as the migration gas.

In some embodiments, as shown in FIG. 1, the gas circulating device 5 further includes a discharged gas flow rate adjusting component 511, and the discharged gas flow rate adjusting component 511 is arranged between the inlet of the discharged gas purification device 55 and the discharged gas interface 412 of the ion mobility spectrometry device 4 for adjusting the flow rate of the discharged gas that flows from the ion mobility spectrometry device 4 to the discharged gas purification device 55.

Since the discharged gas flow rate adjusting component 511 is provided, a user can adjust the flow rate of the discharged gas from the discharged gas interface, and according to the charge properties (positive or negative) of the desired product ions in the pre-separated sample, the user can choose to detect only in one mode corresponding to a positive mode or a negative mode and cut off the other mode, or to simultaneously detect in the positive and negative modes, to improve the selective detection ability of the gas chromatograph-ion mobility spectrometry combined equipment on a sample A.

In some embodiments, as shown in FIG. 1, the gas circulating device 5 includes a molecular sieve inlet flow rate adjusting component 512, and the molecular sieve inlet flow rate adjusting component 512 is arranged between the diaphragm pump 53 and the molecular sieve to control the flow rate of the gas entering the molecular sieve.

In some embodiments, as shown in FIG. 1, the gas circulating device 5 includes a carrier gas flow rate adjusting component 592, and the carrier gas flow rate adjusting component 592 is arranged between the outlet of the discharged gas purification device 55 and the inlet of the gas chromatograph device 3 for adjusting the flow rate of the discharged gas that flows from the discharged gas purification device 55 to the gas chromatograph device 3.

In addition, the gas circulating device 5 includes a migration gas inlet flow rate adjusting component 591, and the migration gas inlet flow rate adjusting component 591 is arranged between the outlet of the discharged gas purification device 55 and the migration gas inlet 411 of the ion mobility spectrometry device 4 for adjusting the flow rate of the discharged gas that flows from the discharged gas purification device 55 to the ion mobility spectrometry device 4.

As shown in FIG. 1 to FIG. 3, in some embodiments, the gas chromatograph-ion mobility spectrometry combined equipment further includes a sample exchange device 2. The sample exchange device 2 includes a supporting structure 21 and a semipermeable membrane 22. The supporting structure 21 has a hollow chamber 212. The semipermeable membrane 22 is arranged in the hollow chamber 212 and divides the hollow chamber 212 into a collected sample chamber I and a chromatographic sample chamber II. The sample A flows from the collected sample chamber I to the chromatographic sample chamber II through the semipermeable membrane 22 to form the to-be-detected sample. The gas circulating device 5 is communicated with the inlet of the gas chromatograph device 3 by the chromatographic sample chamber II.

The supporting structure 21 of the sample exchange device 2 is, for example, a passivated aluminum member.

In some embodiments, as shown in FIG. 1, the gas chromatograph-ion mobility spectrometry combined equipment includes a sampling device 1, and the sampling device 1 includes a sampling driving device 1a and a sampling head 11.

The sampling driving device 1a and the sampling head 11 are communicated with the collected sample chamber I of the sample exchange device 2. As shown in FIG. 1, the sampling device 1 further includes sampling pipelines, and the sampling driving device 1a and the sampling head 11 respectively communicate with the collected sample chamber I through the sampling pipelines. The sampling driving device 1a applies an attraction force to the sample A collected by the sampling head 11 to drive the sample A to enter the collected sample chamber I. The sampling driving device 1a may be a sampling pump 12.

In some embodiments, as shown in FIG. 2, the hollow chamber 212 is a fusiform chamber having small cross-sectional areas at both ends and a large cross-sectional area at the middle. The collected sample chamber I is provided with a sample inlet 21a for receiving the sample A and a sample exhaust gas outlet 21b for discharging a sample exhaust gas. The sample inlet 21a and the sample exhaust gas outlet 21b are respectively arranged at two ends of the fusiform chamber. The chromatographic sample chamber II is provided with a carrier gas inlet 21c for receiving the above-mentioned part of the discharged gas serving as the carrier gas and a sample output port 21d for outputting a mixture of the to-be-detected sample and the carrier gas to the gas chromatograph device 3, and the carrier gas inlet 21c and the sample output port 21d are respectively arranged at two ends of the fusiform chamber. Due to the arrangement manner of the hollow chamber 212 of the supporting device 21, there is basically no flow dead angle in the hollow chamber 212, which is beneficial to preventing sample retention, and the fluid entering the corresponding chamber of the hollow chamber 212, flows at a reduced speed firstly and then accelerates to flow out, which is beneficial to increasing the effective acting area of the semipermeable membrane 22 on the sample, thus the sample exchange efficiency and the cleaning effect of the sample exchange device 2 being improved.

In some embodiments, as shown in FIG. 3, guide grooves 211 are formed in an inner wall of the hollow chamber 212 of the supporting struct configured to guide the gas in the chromatographic sample chamber II to flow. FIG. 2 shows the direction of each guide groove 211 in the supporting structure 21, when the hollow chamber 212 is the fusiform chamber having small cross-sectional areas at both ends and the large cross-sectional area at the middle. The guide grooves 211 can prevent the airflow in the chamber from directly following the shortest path, and also helps to prevent the influence on the performance of the gas chromatograph-ion mobility spectrometry combined equipment due to the local retention of the sample in the corresponding chamber.

As shown in FIG. 3, the supporting structure 21 of the sample exchange device 2 is divided into upper and lower portions. In some embodiments, the guide grooves 211 are comb-shaped guide grooves on the inner walls of the upper and lower portions. The comb-shaped guide grooves of the upper portion and those of the lower portion are separated by the semipermeable membrane 22, so that the hollow chamber 212 is divided into upper and lower portions, wherein the upper portion is the collected sample chamber I, and the lower portion is the chromatographic sample chamber II.

In some embodiments, as shown in FIG. 3, the sample exchange device 2 further includes a semipermeable membrane heating device 2a, and the semipermeable membrane heating device 2a is configured to heat the semipermeable membrane 22. The semipermeable membrane heating device 2a is configured to perform, for example, pulse heating on the semipermeable membrane 22.

In some embodiments, ceramic heating sheets 23 are provided with to serve as the semipermeable membrane heating device 2 as in both the upper portion and the lower portion of the supporting structure 21 of the sample exchange device 2. The ceramic heating sheets 23 are as close as possible to the semipermeable membrane 22 to ensure a pulse heating effect.

In some embodiments, the sample exchange device includes a semipermeable membrane cooling device, and the semipermeable membrane cooling device is configured to cool the semipermeable membrane 22. By disposing the semipermeable membrane cooling device, the sample exchange device and the semipermeable membrane thereof can be adjusted to a desired temperature more quickly, which is conducive to improving the detection efficiency of the gas chromatograph-ion mobility spectrometry combined equipment. The semipermeable membrane cooling device includes a fan or a fluid cooling device or the like.

In some embodiments, the gas circulating device 5 includes a communication port 561 in communication with the atmosphere and a communication gas purification device 56 for purifying the gas flowing through the communication port 561. As shown in FIG. 1, in order to reduce the influence of temperature change, environmental pressure change and the like on the internal pressure of the ion mobility spectrometry device 4, a T-junction 54 is arranged between the diaphragm pump 53 and the molecular sieve, wherein one end of the T-junction 54 is connected with the molecular sieve, and the other end thereof is connected with the communication gas purification device 56 and then is communicated with the atmosphere. A purifying agent is provided inside the communication gas purification device 56 to purify the gas flowing through the communication port 561. Based on such semi-opening configuration, the ion mobility spectrometry device 4 can perform automatic inflation and deflation according to the environmental change and its own temperature change, to reduce the influence of the external environment on the ion mobility spectrometry device 4, and being conducive to prolonging the service life of the molecular sieve.

The ion mobility spectrometry device 4, the chromatographic column 31 and the sample exchange device 2 of the gas chromatograph-ion mobility spectrometry combined equipment in the present embodiment are heated before the sample is detected. The temperature of the ion mobility spectrometry device 4 and the chromatographic column 31 can be determined according to the physical and chemical properties of the sample A. When the gas chromatograph-ion mobility spectrometry combined equipment provided by the disclosure performs substance detection and identification, the sample is injected in semipermeable membrane pulse heating injection mode or direct penetration injection mode.

The semipermeable membrane pulse heating sample injection mode may be specifically performed as follows: the sample exchange device 2 is kept at the normal temperature or lower than the penetration temperature of the semipermeable membrane, and the sampling pump 12 is continuously turned on, to enrich the sample A in vapor on the semipermeable membrane 22; after the sample A is enriched, the sampling pump 12 is turned off or slowed down, the sample exchange device 2 and the semipermeable membrane 22 are quickly heated up by the ceramic heating sheets 23 and are maintained at the desorption temperature, so that the enriched sample A is quickly desorbed from the semipermeable membrane 22 and permeates into the chromatographic sample chamber II below the semipermeable membrane 22 to form the to-be-detected sample, then the to-be-detected sample is detected and analyzed after being carried into the gas chromatograph device 3 and the ion mobility spectrometry device 4 by the foregoing part of discharged gas serving as the chromatographic sample injection carrier gas; after the desorption and sample injection are completed, a power switch of the ceramic heating sheets 23 of the sample exchange device 2 is turned off. In order to improve the detection efficiency, the semipermeable membrane cooling device such as a fan or a fluid cooling device may be used to help cool the sample exchange device 2, and after the sample exchange device 2 is cooled to a certain temperature, such as a temperature of 60° C. or below, the sampling and the detection on the next detected sample are performed.

The advantages of the semipermeable membrane pulse heating sample injection mode lie in that, the enrichment of the sample A is achieved, and the detection sensitivity of the gas chromatograph-ion mobility spectrometry combined equipment is improved; at the same time, the rapid penetration of the sample A is also achieved, and the consistency of sample injection time is improved, to improve the chromatographic resolution of the detected sample.

When the sample injection is performed in the direct penetration sample injection mode, the sample exchange device 2 and the semipermeable membrane 22 are always kept at a relatively high temperature, for example, the temperature of the sample exchange device 2 is set at 100° C. or above. During the sampling and the detection, the sampling head 11 is aligned with and close to the to-be-detected object, then the sampling pump 12 is turned on, such that the sample A enters the sampling pipeline through the sampling head 11, and reaches the sample exchange device 2 through the sampling pipeline. The semipermeable membrane 22 in the sample exchange device 2 effectively blocks water vapor and ammonia in the sample A at the outside of the semipermeable membrane 22, and the detected sample quickly infiltrates into the chromatographic sample chamber II, then the detected sample is carried by the chromatographic sample injection carrier gas into the chromatographic column 31 for pre-separation to form the pre-separated sample, and the pre-separated sample enters the ion mobility spectrometry device 4 for detection and analysis.

The advantages of the direct infiltration sample injection mode lie in that, the detection efficiency is high, but the detection effect of the sample A with low concentration is not as good as that of the semipermeable membrane pulse heating sample injection mode.

As can be seen, the gas chromatograph-ion mobility spectrometry combined equipment in the embodiment of the present disclosure has at least one of the following technical effects:

The chromatographic sample injection carrier gas adopts the clean circulating air, therefore no external or built-in gas tank is needed, to improve the miniaturization and the portability of the gas chromatograph-ion mobility spectrometry combined equipment, and expanding the application environment of the gas chromatograph-ion mobility spectrometry combined equipment.

By combining the inspiratory sampling and the semipermeable membrane penetration sample injection mode, neither destructive sampling nor pre-treatment needs to be performed on the sample A, and direct inspiratory sampling and infiltration sample injection via the semipermeable membrane 22 are directly executed, so that the sampling and detection time of the sample A is greatly shortened compared with the conventional gas chromatograph-ion mobility spectrometry combined equipment, thus the detection efficiency of the sample A being improved, the rapid detection of the complex sample A being realized, and the application field of the gas chromatograph-ion mobility spectrometry combined equipment being expanded.

The semi-open circulating gas path and the flexible buffer devices can automatically keep balance with the external air pressure according to the use environment and the operating conditions, to reduce the influence of the pressure change on the peak and the detection accuracy.

The above descriptions are only exemplary embodiments of the present disclosure, and are not intended to limit the present disclosure. Any modifications, equivalent substitutions, improvements and the like, made within the spirit and scope of the present disclosure, should be included in the protection scope of the present disclosure.

The invention claimed is:

1. A gas chromatograph-ion mobility spectrometry combined equipment, comprising:
   a gas chromatograph device, configured to pre-separate a to-be-detected sample to form a pre-separated sample;
   an ion mobility spectrometry device, in fluid communication with an outlet of the gas chromatograph device for detecting the pre-separated sample;
   a gas circulating device in fluid communication with a discharged gas interface of the ion mobility spectrometry device for processing a discharged gas from the ion mobility spectrometry device, wherein the gas circulating device is in gas communication with the gas chromatograph device for conveying a part of the discharged gas to the gas chromatograph device to serve as a carrier gas, which drives the to-be-detected sample to enter the gas chromatograph device; and
   a sample exchange device, comprising a supporting structure and a semipermeable membrane, wherein the supporting structure has a hollow chamber, the semipermeable membrane is arranged in the hollow chamber to divide the hollow chamber into a collected sample chamber and a chromatographic sample chamber, a sample flows from the collected sample chamber to the chromatographic sample chamber through the semipermeable membrane to form the to-be-detected sample, and the gas circulating device is communicated with the inlet of the gas chromatograph device by the chromatographic sample chamber.

2. The gas chromatograph-ion mobility spectrometry combined equipment according to claim 1, wherein the gas circulating device comprises a discharged gas purification device for purifying the discharged gas, and the part of the discharged gas is purified discharged gas from the discharged gas purification device.

3. The gas chromatograph-ion mobility spectrometry combined equipment according to claim 2, wherein the gas circulating device further comprises at least one of the following:
   a first discharged gas driving device, communicating the discharged gas interface and an inlet of the discharged gas purification device for driving the discharged gas from the ion mobility spectrometry device to enter the discharged gas purification device; and
   a second discharged gas driving device, being arranged between an outlet of the discharged gas purification device and an inlet of the gas chromatograph device for driving the part of the discharged gas to enter the gas chromatograph device.

4. The gas chromatograph-ion mobility spectrometry combined equipment according to claim 3, wherein the first discharged gas driving device comprises a diaphragm pump; and/or, the second discharged gas driving device comprises a booster pump.

5. The gas chromatograph-ion mobility spectrometry combined equipment according to claim 2, wherein the gas circulating device further comprises at least one of the following:
   a first buffer device, communicating the discharged gas interface and an inlet of the discharged gas purification device; and
   a second buffer device, communicating an outlet of the discharged gas purification device and an inlet of the gas chromatograph device.

6. The gas chromatograph-ion mobility spectrometry combined equipment according to claim 5, wherein the first buffer device comprises a first buffer film and a first buffer chamber structure with a first opening, and the first buffer film is disposed at the first opening to seal the first opening; and/or, the second buffer device comprises a second buffer film and a second buffer chamber structure with a second opening, and the second buffer film is disposed at the second opening to seal the second opening.

7. The gas chromatograph-ion mobility spectrometry combined equipment according to claim 5, wherein the gas circulating device further comprises a second buffer device communicating an outlet of the discharged gas purification device and an inlet of the gas chromatograph device, and the second buffer device communicates the outlet of the discharged gas purification device and a migration gas inlet of the ion mobility spectrometry device, so that a part of discharged migration gas purified by the discharged gas purification device enters the ion mobility spectrometry device to serve as a migration gas.

8. The gas chromatograph-ion mobility spectrometry combined equipment according to claim 2, wherein the gas circulating device further comprises at least one of the following:
   a discharged gas flow rate adjusting component, being arranged between an inlet of the discharged gas purification device and a discharged gas interface of the ion mobility spectrometry device for adjusting the discharge gas flow rate of the discharged gas that flows from the ion mobility spectrometry device to the discharged gas purification device; and
   a carrier gas flow rate adjusting component, being arranged between an outlet of the discharged gas purification device and an inlet of the gas chromatograph device for adjusting the carrier gas flow rate of the discharged gas that flows from the discharged gas purification device to the gas chromatograph device.

9. The gas chromatograph-ion mobility spectrometry combined equipment according to claim 1, comprising a sampling device, and the sampling device comprises a sampling driving device and a sampling head, wherein the sampling driving device and the sampling head are communicated with the chromatographic sample chamber, and the sampling driving device drives the sample collected by the sampling head to enter the collected sample chamber by applying an attraction force to the sample.

10. The gas chromatograph-ion mobility spectrometry combined equipment according to claim 1, wherein the hollow chamber is a fusiform chamber having smaller cross-sectional areas at both ends and a larger cross-sectional area at a middle, the collected sample chamber is provided with a sample inlet for receiving the sample and a sample exhaust gas outlet for discharging a sample exhaust gas, the sample inlet and the sample exhaust gas outlet being respectively arranged at two ends of the fusiform chamber, and the chromatographic sample chamber is provided with a carrier gas inlet for receiving the part of the discharged gas and a sample output port for outputting a mixture of the to-be-detected sample and the carrier gas to the gas chromatograph device, and the carrier gas inlet and the sample output port being respectively arranged at two ends of the fusiform chamber.

11. The gas chromatograph-ion mobility spectrometry combined equipment according to claim 1, wherein a guide groove is formed on an inner wall of the hollow chamber, and the guide groove is configured to guide gas in at least one of the collected sample chamber or the chromatographic sample chamber to flow.

12. The gas chromatograph-ion mobility spectrometry combined equipment according to claim 1, wherein the sample exchange device further comprises at least one of the following: a semipermeable membrane heating device, configured to heat the semipermeable membrane; and a semipermeable membrane cooling device, configured to cool the semipermeable membrane to achieve sample enrichment.

13. The gas chromatograph-ion mobility spectrometry combined equipment according to claim 12, wherein the sample exchange device further comprises a semipermeable membrane heating device, the semipermeable membrane heating device is configured to perform pulse heating on the semipermeable membrane.

14. The gas chromatograph-ion mobility spectrometry combined equipment according to claim 1, wherein the gas circulating device comprises a communication port in communication with atmosphere and a communication gas purification device for purifying the gas flowing through the communication port.

* * * * *